(12) United States Patent
Gustafsson et al.

(10) Patent No.: US 6,673,448 B2
(45) Date of Patent: Jan. 6, 2004

(54) ELECTRIC CABLE AND A METHOD FOR THE PRODUCTION THEREOF

(75) Inventors: Bill Gustafsson, Stenungsund (SE); Hans Eklind, Göteborg (SE); Ruth Dammert, Västra Frölunda (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/840,608

(22) Filed: Apr. 20, 2001

(65) Prior Publication Data

US 2002/0081429 A1 Jun. 27, 2002

Related U.S. Application Data

(63) Continuation of application No. PCT/SE99/01894, filed on Oct. 21, 1999.

(30) Foreign Application Priority Data

Oct. 23, 1998 (SE) ............................................ 9803625

(51) Int. Cl.$^7$ ............................ D02G 3/00; H01C 1/02; B05D 5/12
(52) U.S. Cl. ....................... 428/379; 428/372; 428/383; 252/511; 427/118; 174/110 PM; 174/102 SC; 174/120 SC
(58) Field of Search .................. 428/375, 372, 428/379, 383; 427/118; 252/511; 174/110 PM, 102 SC, 120 SC

(56) References Cited

U.S. PATENT DOCUMENTS

| 4,286,023 A | 8/1981 | Ongchin |
| 4,399,060 A | 8/1983 | Glass |
| 5,543,233 A | 8/1996 | Latiolais et al. |

FOREIGN PATENT DOCUMENTS

| EP | 0 057 604 | 11/1982 |
| FR | 2 310 617 | 12/1976 |
| WO | WO 99/20690 | 4/1999 |

OTHER PUBLICATIONS

WPI, Derwent Accession No. 88–010439, Nippon Petrochemicals Co., Ltd. "Ethylene–ethyl acrylate copolymer, for electric insulating material is prepd. by copolymerising ethylene and ethyl acrylate using a tubular reactor with controlled inlet–pressure and reacting temp", & JP 62273214, Nov. 27, 1987.

JP 63279503 A Abstract. WPI accession No. 89–002856, Furukawa Electric Co., Ltd. "Semiconductor compsn., for conductive layers of cable–contg. mixt comprising ethylene–methyl–methacrylate copolymer and carbon black crosslinked with organic peroxide", Nov. 16, 1998.

JP 63268753 A Abstract. WPI accession No. 1998–357701. Furukawa Electric Co., Ltd. "Electro semiconductive compsn. for power cables–comprises ethylene–methacrylic acid copolymer", Nov. 7, 1998.

Schadlich et al. "Model cable test for evaluating the ageing behavior under water influence of compounds for medium voltage cables", Conference Proceedings of Jlcable 1991, Jun. 24–28, 1991, Versaille, France.

Primary Examiner—Marie Yamnitzky
Assistant Examiner—J. M. Gray
(74) Attorney, Agent, or Firm—Merchant & Gould P.C.

(57) ABSTRACT

A semiconducting composition for electric cables, an electric cable incorporating the composition, and a method of producing a cross-linked semiconducting layer of an electric cable are disclosed. The semiconducting composition comprises, based on the total weight of the composition, (a) 50–90% by weight of an ethylene copolymer,
(b) carbon black in an amount at least sufficient to make the composition semiconducting,
(c) 0–8% by weight of a peroxide cross-linking agent,
(d) 0–8% by weight of conventional additives, characterised in that the ethylene copolymer (a) is a heterogeneous ethylene-alkyl(meth)acrylate copolymer, which besides ethylene moieties comprises 2–10 mole % of an alkyl(meth)acrylate comonomer moiety, chosen among methyl (meth)acrylate, ethyl(meth)acrylate, (iso-)propyl(meth)acrylate and butyl(meth)acrylate, and the melting point of which is at least 95° C. and is higher than (108.5–1.7×(mole % of alkyl (meth)acrylate comonomer)) degree centigrade. The copolymer is preferably obtained by high pressure radical polymerisation in a tubular reactor.

13 Claims, No Drawings

ELECTRIC CABLE AND A METHOD FOR THE PRODUCTION THEREOF

This application is a continuation of international application number PCT/SE99/01894, filed Oct. 21, 1999.

FIELD OF THE INVENTION

The present invention relates to electric cables and particularly the invention relates to semiconducting layers of electric cables, preferably to cross-linked, semiconducting layers of electric cables, and more preferably to cross-linked, inner and non-strippable outer semiconducting layers of electric cables.

BACKGROUND OF THE INVENTION

Electric cables and particularly electric power cables for medium and high voltages are composed of a plurality of polymer layers extruded around the electric conductor. The electric conductor is usually coated first with an inner semiconducting layer followed by an insulating layer, then an outer semiconducting layer. To these layers further layers may be added, such as a water barrier layer and a sheath layer.

The insulating layer and the semiconducting layers normally consist of ethylene homo- and/or copolymers which preferably are cross-linked. LDPE (low density polyethylene, i.e. polyethylene prepared by radical polymerisation at a high pressure) cross-linked by adding peroxide, for instance dicumyl peroxide, in connection with the extrusion of the cable, is today the predominant cable insulating material. The inner semiconducting layer normally comprises an ethylene copolymer, such as an ethylene-vinyl acetate copolymer (EVA). The composition of the outer semiconducting layer differs depending on whether it has to be strippable or not. Normally a strippable semiconducting layer comprises an ethylene copolymer, such as an EVA together with an acrylonitrile-butadiene rubber (NBR) and sufficient carbon black to make the composition semiconducting. A non-strippable (bonded), outer semiconducting layer may comprise EVA, EEA or EBA together with an amount of carbon black sufficient to make the composition semiconducting.

As an example of non-strippable type semiconducting compositions, mention may be made of EP 0 057 604 which discloses, in its examples, three semiconductive compositions, where semiconductive composition A contained 59.25% by weight of an EVA containing 20% by weight of vinyl acetate (VA) comonomer, 40.00% by weight of acetylene black, 0.2% by weight of antioxidant and 0.55% by weight of dicumyl peroxide (DCP) cross-linking agent, composition B contained 83.8% by weight of an EVA containing 18% by weight of VA comonomer, 15% by weight of Ketchen black, 0.2% by weight of antioxidant and 1.0% by weight of DCP and composition C contained 61.2% by weight of EVA containing 20% by weight of VA comonomer, 38% by weight of furnace black, 0.2% by weight of antioxidant and 0.6% by weight of DCP.

As an example of prior art strippable semi-conducting compositions for electric cables, mention may be made of U.S. Pat. No. 4,286,023 which discloses a polymer composition for electric cables comprising (A) an ethylene copolymer selected from the group consisting of ethylene-alkyl acrylate copolymers containing about 15–45% by weight of alkyl acrylate, said alkyl acrylate being selected from the group consisting of $C_1$–$C_8$ alkyl esters of (meth)-acrylic acid, such as methyl acrylate, ethyl acrylate, methyl methacrylate, butyl acrylate, 2-ethylhexyl acrylate and the like, and ethylene-vinyl acetate copolymers containing about 15–45% by weight of vinyl acetate, (B) a butadiene-acrylonitrile copolymer (nitrile rubber) containing about 10–50% by weight of acrylonitrile, (C) conductive carbon black, and (D) a peroxide cross-linking agent, wherein the weight ratio A:B=1:9 to 9:1; C:(A+B)=0.1 to 1.5, and D is present in an amount of 0.2–5% by weight of the total composition.

It should be noted that U.S. Pat. No. 4,286,023 relates to strippable outer semiconducting layers. Inner and non-strippable outer semiconducting layers are not disclosed.

It should also be noted that ethylene-vinyl acetate copolymer is the preferred component (A) according to U.S. Pat. No. 4,286,023. If component (A) is selected from $C_1$–$C_8$ alkyl esters of acrylic acid and methacrylic acid, the preferred copolymer is ethylene-ethyl acrylate copolymer.

Although prior art compositions for semiconducting layers in electric cables are satisfactory for many applications, there is always a desire to improve their characteristics and eliminate or reduce any disadvantages they may have.

One disadvantage of EVA conventionally used in semiconducting layers is that at elevated temperatures, such as during compounding of the semiconducting composition, EVA starts to decompose and generate acetic acid at about 150° C. At the same time double-bonds are formed in the polymer chain. The acetic acid, which is very corrosive, especially at high temperatures, attacks the processing equipment and leads to an undesired corrosion thereof. To a certain extent this may be counteracted by making the equipment of special, corrosion-resistant materials which, however, are expensive and add to the investment cost for manufacturing the cable. The release of acetic acid is also a negative factor from an environmental point of view. Further, the formation of double-bonds in the polymer chain at the generation of acetic acid may lead to undesired cross-linking and gel formation.

Another disadvantage of EVA as a material for the semiconducting layers of electric cables manifests itself when cross-linking (vulcanising) cables. The cross-linking is usually conducted in an about 100–200 m long vulcanising tube, where cross-linking should take place as rapidly and completely as possible. For conventional cables having semiconducting EVA-containing layers, cross-linking is carried out at a temperature of about 260–300° C., preferably 270–285° C. A nitrogen-gas pressure of about 8–10 bar is applied in the vulcanising tube and contributes to the preventing of oxidation processes by keeping away the oxygen of the air and to reducing the formation of microcavities, so-called voids, in the polymer layers. As explained above in connection with compounding of EVA, the elevated temperature at the cross-linking of EVA also causes generation of acetic acid and gel formation. The more elevated temperature at the cross-linking step compared to the compounding step results in a correspondingly increased generation of acetic acid and formation of gel. Besides having an obnoxious smell, the acetic acid generated means a loss of VA from the EVA-containing layer and, probably connected therewith, a reduced strippability when making cables with a strippable outer semiconducting EVA-containing layer. Further, the acetic acid released condenses in the vulcanising tube together with other volatile substances and forms a viscous sticky liquid at the bottom of the vulcanising tube. This liquid must be removed from the vulcanising tube as otherwise it tends to adhere to and contaminate the surface of the cable. This implies production stops and lower productivity.

Yet another problem with electric cables is the so-called "shrink-back" phenomenon, which manifests itself in particular when standard type EEA or EBA based semiconducting compositions are used as inner semiconductive layers on cables with solid conductors. This problem is related to the fact that the metal conductor of the cable and the polymer coating layers of the cable shrink differently when cooled. After making the cable by extrusion and cross-linking of the polymer layers around the metal conductor as described earlier, the cable is cut into lengths of a suitable dimension and cooled to ambient temperature. Upon cooling the polymer layers of the cable shrink more than the metallic conductor. This shrinking decreases the diameter of the cable coating and also decreases its length along the cable. The last mentioned lengthwise shrinking makes the metallic conductor protrude beyond the cable coating at both ends of the cable (the coating shrinks back from the metallic conductor). The shrink-back of the cable coating also depends on adhesion between the coating, more particularly the inner semiconducting layer, and the metal conductor. The better the adhesion between the inner semiconducting layer and the metal conductor, the smaller the shrink-back, because the increased friction to the conductor inhibits the relaxation of the polymer layer. Standard type ethylene ethyl acrylate (EEA) or ethylene butyl acrylate (EBA), i.e. EEA or EBA with a substantially uniform or random comonomer distribution, both exhibit a relatively high amount of shrink-back compared to EVA due to poor adhesion to the conductor. It should be added that the shrink-back phenomenon is more pronounced for cables with a solid conductor than for cables with stranded conductors due to the smaller area of contact between the metal and polymer in the first-mentioned case.

If one tries to overcome the shrink-back problem of standard type EEA and EBA by increasing the amount of EA and BA in the polymer, respectively, the mechanical characteristics of the EEA and EBA polymers deteriorate to an unacceptable degree. This explains why EEA and EBA have not replaced EVA as polymer for the inner semiconducting layer of electric cables with a solid conductor.

To sum up, EVA is normally used as polymer for semi-conducting layers of electric cables, although it has poor thermal stability and decomposes with generation of acetic acid at high temperatures. EEA and EBA are used as polymers for bonded outer semiconducting layers and for inner semiconducting layers only on cables with stranded conductors, due to the above-mentioned shrink-back problem.

SUMMARY OF THE INVENTION

The present invention is based on the discovery that the above problems and disadvantages of the prior art are solved or alleviated by using specific, non-uniform or heterogeneous ethylene-alkyl (meth)acrylate copolymers, preferably heterogeneous ethylene copolymers with methyl (meth)acrylate (M(M)A), ethyl (meth)acrylate (E(M)A), (iso-)propyl (meth)acrylate (P(M)A) or butyl (meth)-acrylate (B(M)A), as the ethylene copolymer in the semiconducting layer.

By the term "heterogeneous" used herein is meant a copolymer with the comonomer units distributed non-randomly in the polymer chains as opposed to a homogenous copolymer wherein the comonomer units are distributed randomly in the polymer chains. Usually, homogeneous copolymers are obtained by polymerisation in an autoclave. The term "alkyl (meth)acrylate" used herein refers to alkyl acrylate as well as alkyl methacrylate. The ethylene-alkyl (meth)acrylate copolymers have high melting points, are highly temperature stable and do not split off any acetic acid when being processed at temperatures that would be critical for an EVA-based composition. In addition, the specific, non-uniform ethylene-alkyl (meth)acrylate copolymers according to the present invention surprisingly lower the amount of carbon black required to make the composition semiconductive, something that confers a distinct economical advantage.

Thus, the present invention provides a semiconducting composition for electric cables which, based on the total weight of the composition, comprises
(a) 50–90% by weight of an ethylene copolymer,
(b) carbon black in an amount at least sufficient to make the composition semiconducting,
(c) 0–8% by weight of a peroxide cross-linking agent,
(d) 0–8% by weight of conventional additives, characterised in that
    the ethylene copolymer (a) is a heterogeneous ethylene-alkyl (meth)acrylate copolymer, which besides ethylene moieties comprises 2–10 mole % of an alkyl(meth)acrylate comonomer moiety, chosen among methyl (meth)acrylate, ethyl(meth)acrylate, (iso-)propyl(meth)acrylate and butyl(meth)acrylate, and the melting point of which is at least 95° C. and is higher than (108.5–1.7×(mole % of alkyl(meth)acrylate comonomer)) degree centigrade.

The present invention also provides an electric cable including a conductor which, in the order from inside and outwards, is surrounded by an inner semiconducting layer, an insulating layer, and an outer semiconducting layer, at least one of said inner and outer semiconducting layers being derived from a semiconducting composition which, based on the total weight of the composition, comprises
(a) 50–90% by weight of an ethylene copolymer,
(b) carbon black in an amount at least sufficient to make the composition semiconducting,
(c) 0–8% by weight of a peroxide cross-linking agent,
(d) 0–8% by weight of conventional additives, characterised in that
    the ethylene copolymer (a) is a heterogeneous ethylene-alkyl (meth)acrylate copolymer, which besides ethylene moieties comprises 2–10 mole % of an alkyl(meth)acrylate copolymer moiety, chosen among methyl (meth)acrylate, ethyl(meth)acrylate, (iso-)propyl(meth)acrylate and butyl(meth)acrylate, and the melting point of which is at least 95° C. and is higher than (108.5×1.7×(mole % of alkyl(meth)acrylate comonomer)) degree centigrade.

The present invention further provides a method of producing a cross-linked semiconducting layer of an electric cable including a conductor which, in the order from inside and outwards, is surrounded by an inner semiconducting layer, an insulating layer, and an outer semiconducting layer, at least one of said inner and outer semiconducting layers being derived from a cross-linkable, semiconducting composition which, based on the total weight of the composition, comprises
(a) 50–90% by weight of an ethylene copolymer,
(b) carbon black in an amount at least sufficient to make the composition semiconducting,
(c) 0.2–8% by weight of a peroxide cross-linking agent,
(d) 0–8% by weight of conventional additives,
characterised in that
    the ethylene copolymer (a) is a heterogeneous ethylene-alkyl(meth)acrylate copolymer, which besides ethylene moieties comprises 2–10 mole % of an alkyl(meth)acrylate comonomer moiety, chosen among methyl(meth)acrylate, ethyl(meth)acrylate, (iso-)propyl(meth)acrylate and butyl(meth)acrylate, and the melting point of which is at least 95° C. and is higher than (108.5×1.7×(mole % of alkyl(meth)acrylate comonomer)) degree centigrade, and that the composition is cross-linked at a temperature of 300–400° C.

Further characterising features and advantages of the present invention will appear from the following description and the appended claims.

DETAILED DESCRIPTION OF THE INVENTION

As mentioned above, the semiconducting composition according to the present invention differs from prior semi-conducting EVA-containing compositions in that it does not generate any acetic acid at elevated temperatures. This is an important advantage, because it means that corrosion of the equipment when processing the composition will be greatly reduced or eliminated. Accordingly, it is not neccessary to use expensive, highly corrosion-resistant materials for the equipment. Further, the absence of generation of obnoxious acetic acid means a substantial improvement of the working environment at plants producing the semiconducting composition and electric cables containing the same.

Another important advantage of the present invention is the thermal stability of the ethylene-alkyl (meth)-acrylate copolymers and, consequently, of compositions containing any of those. This thermal stability means that the composition can be heated to higher temperatures, e.g. during compounding and cross-linking (vulcanisation) than other known compositions such as EVA without any risk of the composition decomposing. When the temperature of the composition is increased, its viscosity is reduced and the reduced viscosity means that the energy required to compound the composition is reduced too, i.e. a greater amount of composition can be compounded with the same amount of energy compared to conventional compositions. This fact may be used to advantage in two ways, namely either the same amount of composition may be compounded during the same period of time with a smaller amount of energy, or a greater amount of composition may be compounded during the same period of time with the same amount of energy, i.e. the productivity is increased. In both instances the present invention leads to a more economical and cost-saving processing of the composition.

As an illustration of the above, EVA is compounded at a temperature of about 175–180° C., while ethylene-alkyl (meth)acrylate copolymers of the present invention may be compounded at an about 25° C. higher temperature thanks to their superior resistance to thermo-oxidative degradation. This means that the processing "window" is much wider for ethylene-alkyl (meth)acrylate copolymers of the present invention than for EVA and also that the productivity may be increased for ethylene-alkyl (meth)acrylate copolymers of the present invention compared to EVA.

As a further illustration, prior art EVA compositions are cross-linked at about 260–300° C., preferably about 270–285° C., and temperatures above about 300° C. are not used because of excessive acetic acid generation. In comparison, the ethylene-alkyl (meth)acrylate-containing copolymers of the present invention may be cross-linked at temperatures up to about 400° C., preferably up to about 390° C. without inconvenience. Although, like for the known EVA compositions, the lower cross-linking temperature limit of ethylene-alkyl (meth)acrylate copolymers of the present invention is about 260° C., it is a specific aspect of the present invention to cross-link the ethylene-alkyl (meth)acrylate copolymer-containing compositions of the present invention at more elevated temperatures of about 300–400° C., preferably about 360–390° C.

This higher cross-linking temperature results in a more rapid cross-linking which in turn makes a higher line speed possible in the cable production. Thus, the line speed when producing a cable with a cross-linked semiconducting ethylene-alkyl (meth)acrylate copolymer-containing layer according to the present invention may be increased by 10–30% compared to the line speed of a comparable cable with a cross-linked semiconducting EVA-containing layer.

The circumstance that the temperature, when cross-linking ethylene-alkyl (meth)acrylate copolymers of the present invention, may be as much as about 100° C. higher than when cross-linking EVA considering that, when compounding ethylene-alkyl (meth)acrylate copolymers of the present invention, the temperature advantage to EVA is "only" about 25° C., may be explained by the fact that cross-linking is carried out in an essentially non-oxidising atmosphere, whereas oxygen is to some extent present during compounding, especially in connection with production stops. Thus, any degradation during cross-linking is of an essentially thermal nature, whereas it is of a thermo-oxidative nature during compounding.

While both standard type EMA and EMMA and the corresponding heterogeneous copolymers of the present invention show an adhesion to a metallic conductor similar to that of an EVA of similar comonomer contents, that is not the case for standard EEA:s and EBA:s. A special advantage of the heterogeneous EE(M)A, EP(M)A and EB(M)A of the present invention, in comparison with standard, more or less homogeneous EEA and EBA, is that, at a certain comonomer content, their adhesion to a solid conductor is improved so that the shrink-back phenomenon is no longer of importance.

The perhaps most important and quite surprising advantage of the present invention is that the specific non-uniform ethylene-alkyl (meth)acrylate copolymer of the present invention markedly reduces the amount of carbon black that is necessary to make the semiconducting layer semiconducting. Generally, about 2–3% by weight less carbon black is required with the non-uniform ethylene-alkyl (meth)acrylate copolymer of the invention than with other uniform ethylene-alkyl (meth)acrylate copolymers having the corresponding comonomer contents. A more efficient use of the carbon black will thus be obtained. As carbon black is an expensive component the reduced requirement for carbon black at the present invention is an important advantage. The reason why less carbon black is required in the semiconducting composition according to the present invention compared to other prior art semiconducting compositions is not totally clear. Without binding ourselves to any specific theory, we still find it likely that the reason lies in the fact that the copolymers of the present invention actually form heterogeneous two-phase systems, consisting of a more or less comonomer-free LDPE as one phase and a comonomer-rich ethylene-alkyl (meth)acrylate copolymer as a second phase. The carbon black in all probability tends to lie in the comonomer-rich phase, which will form streaks within the LDPE-type matrix, streaks which will enhance conductivity.

The two-phase system also probably is an important factor behind increased adhesion to the metallic conductor, in so far as a comonomer-rich phase will tend to get enriched along the surface of the metallic conductor and thereby will contribute to increased adhesion. The consequence of this is that less comonomer is needed to achieve a sufficient adhesion and shrinkback, which will reduce the cost of the compound as the comonomer is more expensive than ethylene.

To sum up, for use in inner and outer semiconducting layers, preferably cross-linked inner and outer semiconducting layers, the heterogeneous ethylene-alkyl (meth)-acrylate-containing composition according to the present invention shows substantial and decisive advantages, not only in comparison with EVA, but surprisingly also in comparison with homogeneous ethylene-alkyl acrylate copolymers.

As stated earlier, the semiconducting composition of the invention comprises as a component (a) 50–90% by weight of an ethylene-alkyl (meth)acrylate copolymer, based on the total weight of the composition. The relative amounts of copolymer and of carbon black used depend on the type of carbon black used, since the conductivity of the latter differs with type. The amount of alkyl (meth)acrylate comonomer in the ethylene-alkyl (meth)acrylate copolymer is preferably 3–25% by weight, more preferably 7–18% by weight, when, as in the present invention, intended for bonded outer semiconducting layers or inner semiconducting layers. When the amounts of the alkyl (meth)acrylate comonomer and of the copolymer lie within the ranges stated, optimum performance can be achieved for the semiconducting layer. When an EM(M)A is used, its comonomer contents, in % by weight, lies relatively seen lower than for an EB(M)A, depending on the amount of comonomer needed to get sufficient adhesion to the metallic conductor, sufficiently good dispersion of the carbon black etc, In order to make the composition semiconducting, it includes carbon black as a component (b). The amount of carbon black should of course be at least sufficient to make the composition semiconducting and will therefore be dependent on the type of carbon black used and the conductivity reached by the use of it. Preferably the composition contains 15–45% by weight of carbon black, more preferably 30–40% by weight, based on the total weight of the composition. Any carbon black can be used provided it is electrically conductive. Examples of suitable carbon blacks include furnace blacks and acetylene blacks.

The composition of the invention preferably is cross-linkable and includes a peroxide cross-linking agent as a component (c). The amount of the peroxide cross-linking agent is 0.2–8% by weight, preferably 0.6–2% by weight. Examples of suitable cross-linking agents include organic peroxides such as dicumyl peroxide, bis(t-butylperoxy) diisopropylbenzene, and 2,5-dimethyl-2,5-di(t-butylperoxy) hexyne-3.

In addition to the above components, the semiconducting composition of the present invention may also as a component (d) comprise up to about 8% by weight, preferably up to about 4% by weight, based on the total weight of the composition, of conventional additives, such as processing aids, stabilisers, antioxidants, scorch retardants, water-tree-retarding (WTR) additives, fillers and lubricants.

The specific non-uniform alkyl (meth)acrylate copolymer of the present invention will now be described in greater detail. For the sake of simplicity it will be described with reference to EMA, but it should be understood that it is intended to comprise EMMA, EE(M)A, EP(M)A and EB(M)A as well.

In contrast to the general prior art relating to EMA copolymers where the aim is to obtain a uniform or random monomer distribution of the copolymer, a distinguishing feature of the present invention is that the EMA copolymer is non-uniform (heterogeneous) which inter alia results in an increased melting point of the EMA copolymer.

It has been found that the melting point of the ethylene-alkyl (meth)acrylate copolymer can be used as a relative measure of its heterogeneity. The explanation of this phenomenon is believed to be the following. In a homogeneous copolymer the length of the longest ethylene segments of the polymer molecules is shorter than in a heterogeneous copolymer with the same total amount of comonomer. The ethylene segments contribute to the crystallinity of the polymer and the longer the ethylene segments the larger the crystals will be. Consequently, the longer ethylene segments of a heterogeneous copolymer form larger crystals than the shorter segments of a homogeneous copolymer. As large crystals melt at a higher temperature than small crystals, the melting point of a heterogeneous copolymer becomes higher than that of a corresponding homogeneous copolymer.

It is known to prepare non-uniform ethylene-alkyl acrylate copolymers having increased melting points, and as examples of the prior art may be mentioned U.S. Pat. No. 5,543,233 and JP 62273214 A.

Thus, U.S. Pat. No. 5,543,233 discloses a laminate of ethylene-alkyl acrylate copolymer and polypropylene where the ethylene-alkyl acrylate is said to have an improved melting point and adhesive strength. According to this reference the ethylene-alkyl acrylate copolymer is prepared in a multi-zone high-pressure autoclave polymerisation reactor by feeding different ratios of ethylene to alkyl acrylate comonomer in at least two reaction zones of the autoclave reactor. In the reaction zones the reaction mixture is agitated to produce good radial and longitudinal mixing.

Further, JP 62273214 A, which is restricted to ethylene-ethyl acrylate copolymers, discloses a high melting point ethylene-ethyl acrylate copolymer containing 3–40% by weight of ethyl acrylate. This ethylene-ethyl acrylate copolymer is produced in a tubular reactor at a pressure of 2300–3000 kg/cm$^2$ and at an average reaction temperature which is specifically restricted to 190–230° C. This low reaction temperature range indicates a low conversion (weight percentage of reacted monomers to monomers fed to the reactor) which is undesirable. Ethylene is introduced from an inlet of the reactor and optionally at least one side section, and ethyl acrylate is introduced from the inlet of the reactor. The copolymer is said to be useful as electric insulating material, e.g. electric wire or cable, for the manufacturing of mouldings, e.g. pipes, insulating clothes or blending with other thermoplastic resins.

At the present invention it has been discovered that in order to obtain a non-uniform copolymer, like a non-uniform EMA copolymer in a smooth and simple manner it is preferable to use a tubular reactor. Reactors of the standard autoclave type, such as a stirred autoclave reactor that are generally used for preparing EMA copolymers produce uniform copolymers. The reason for this is that the comonomer concentration is more or less the same all over the rector (at steady state). Although it would be theoretically possible to prepare non-uniform copolymers in an autoclave reactor with multiple injection zones and multiple mixing processing, this is not preferred at the present invention. Such a reactor, like autoclave reactors in general is more suited for the production of uniform copolymers than non-uniform copolymers. In addition, the conversion rate of such a reactor is inferior to that of a tubular reactor. Another reason why tubular reactors are preferable for producing a non-uniform copolymer, like a non-uniform EMA copolymer is that an MA comonomer concentration gradient will occur along the tubular reactor and this gradient results in a variation in the composition of the copolymer chains. The MA monomer, which is a more reactive monomer than the ethylene monomer, is depleted faster than the ethylene monomer during the course of the polymerisation reaction and this substantially changes the composition of the copolymer that is being formed. In other words, the comonomer concentration is higher in those parts of the molecule chains that are formed closest to the comonomer feed point. By feeding most or all of the comonomer to the front of the tubular reactor, whereas the ethylene is fed to additional injection points as well, such as one or more side injection points, an extra high heterogeneity can be obtained. The more non-uniform the EMA copolymer produced is, the higher its melting point. In order to achieve as high a melting point as possible the MA comonomer concentration gradient should therefore be as great as possible, i.e. the MA monomer concentration should be depleted as fast as possible.

Tubular reactors for use in the present invention are known per se and need not be discussed in detail herein. In its simplest form the tubular reactor comprises a tube defining the polymerisation or reaction zone; compressor(s) for feeding the reactants (monomers and initiator, e.g. a peroxide) to the tubular reactor under high pressure; a single inlet or injection point for feeding the reactants into the reactor; an outlet from the tubular reactor for the finished copolymer; and recirculation means for recirculating unreacted reactants.

A more preferred type of tubular reactor that makes it possible to produce more non-uniform and thus higher melting EMA copolymers is the multiple zone tubular reactor. The multiple zone tubular reactor has at least two inlet or injection points for reactants, such as an injection point at the inlet or upstream end of the tubular reactor and one or more side injection points along the reactor dividing the tubular reactor into different polymerisation zones. The zones of the reactor are provided with heating/cooling means as necessary. Usually, a multiple zone tubular reactor has 3–4 reaction zones. When preparing a high melting point EMA copolymer by using a multiple zone tubular reactor according to a preferred embodiment of the present invention the methyl acrylate (MA) is fed to at least one reaction zone of the tubular reactor, while the ethylene is fed to at least two reaction zones of the tubular reactor. For maximum effect with respect to the melting point increase a major proportion, i.e. at least 50% by weight, and preferably all of the MA is fed to the first zone of the tubular reactor.

The ethylene-alkyl(meth)acrylate copolymer of the invention which has been obtained as described above, has a high melting point that is higher than: (108.5−1.7×(mole % of alkyl (meth)acrylate comonomer)) degree centigrade, and that is at least 95° C.

The high heterogeneity of the ethylene-alkyl (meth)-acrylate copolymer of the present invention which manifests itself in the increased melting point as defined above, is a prerequisite for obtaining the previously mentioned advantages regarding adhesion to the conductor of the electric cable and reduction of the amount of carbon black needed for sufficient conductivity.

The increased melting point of the heterogeneous copolymer of the present invention as defined above, should be compared with the melting point of conventional, substantially homogeneous ethylene-alkyl (meth)-acrylate copolymers where e.g. homogeneous EMA and EBA (with 2–10 mole % comonomer) prepared in a stirred autoclave reactor aproximately follow the relationship:

$$T_m = 108.5 - 4.0 \times (\text{mole \% alkyl acrylate comonomer}).$$

By using a multiple zone tubular reactor and varying the weight ratio of methyl acrylate to ethylene in the feed within the limits indicated above preferred high melting point EMA copolymers can be prepared. The highest melting point increase is obtained when the weight ratio of methyl acrylate to ethylene is as high as possible and the number of reaction zones for feeding the methyl acrylate are as low as possible. It is preferred that the weight ratio of methyl acrylate to ethylene in the feed to the first reaction zone lies at least 20% higher than the overall weight ratio of methyl acrylate to ethylene in the final copolymer.

As mentioned earlier, the amount of alkyl (meth)-acrylate in the ethylene-alkyl (meth)acrylate copolymer of the present invention is 2–10 mole %, preferably 2.3–8 mole %, where a lower figure within the range is chosen for an EMA while a higher one is chosen for an EBA.

As mentioned earlier, the radical initiated high pressure polymerisation for preparing the EMA copolymer of the present invention is carried out at a temperature of about 100–350° C. and at a pressure of about 100–300 MPa. Preferably, the pressure is about 200–280 MPa and the temperature is about 115–320° C. The above mentioned temperature ranges include the initiating temperature as well as the peak temperature. In terms of average polymerisation temperature the value at the present invention preferably lies in the range from about 240° C. to about 280° C. This is higher than the average reaction temperature of the above mentioned JP 62273214 A which is limited to 230° C.

By optimising the feeding parameters of the alkyl (meth)acrylate and the ethylene to the tubular reactor an ethylene-alkyl (meth)acrylate copolymer is obtained which has a melting point of at least 95° C., preferably at least 100° C. The enhanced melting point of the ethylene-alkyl (meth)acrylate copolymer of the present invention is of course valuable where the finished ethylene-alkyl (meth)acrylate copolymer product is subject to high temperatures.

The increased melting point of the ethylene-alkyl (meth)acrylate copolymer is also advantageous with regard to pelletising of the copolymer, since a melting point of at least 95° C. means that the pelletising can be carried out by means of a conventional pelletiser without water cooling. Also, the ethylene-alkyl (meth)acrylate copolymer of the invention is less sticky than conventional low melting ethylene-alkyl (meth)acrylate copolymers which means that there is less need to "dust" the pellets with e.g. talc or powdered polyethylene to prevent agglomeration.

As indicated earlier, a free radical initiator is preferably used to catalyse the polymerisation. The initiator may be added to any of the polymerisation zones of the tubular reactor and is preferably added to all the polymerisation zones of the tubular reactor. Preferably, the initiator is a peroxide compound, and examples of peroxides which may be used are tert-butyl peroxypivalate, di-tert-butyl peroxide, tert-butyl perbenzoate, and lauroyl peroxide.

Having thus explained the present invention, it will now be elucidated by way of some non-limiting, illustrative examples. In the examples all percentages and proportions are by weight unless otherwise stated.

Of the examples below, example 1 illustrates the preparation of the non-uniform ethylene-alkyl (meth)-acrylate copolymer used in the semiconducting layer of the present invention.

EXAMPLE 1

To a split feed, high-pressure tubular reactor with three inlets or injection points methyl acrylate (MA) and ethylene (E) were fed in the weight ratio MA:E of 1:1 to the first injection point. This constituted all of the MA and ½ of the ethylene with regard to the overall EMA copolymer. Thus, no MA was fed to the second and third injection points of the tubular reactor, while the remainder of the ethylene (½) was fed to the second injection point of the tubular reactor. Peroxide initiator was fed to all three injection points of the tubular reactor. The polymerisation was carried out at a pressure of about 265 MPa and the peak polymerization temperature was about 315° C. The average polymerisation temperature was 265° C. From the outlet of the tubular reactor an EMA copolymer with about 9% by weight (3.12 mole %) of MA was discharged. Unreacted ethylene leaving the reactor was recycled and fed again to the reactor together with fresh ethylene and methyl acrylate. The melting point of the EMA copolymer obtained was determined and found to be 107° C. The $MFR_2$ of the EMA copolymer was 6 g/10 min, determined according to ISO 1133, condition D. The EMA was easy to pelletise in a conventional pelletiser. The conversion at the polymerisation was 32%.

COMPARATIVE EXAMPLES 2–5

By changing the conditions of example 1 in such a way that the feed of both ethylene and methyl acrylate were equally divided between the first and the second injection port four further resins were produced. Peroxide was fed to all the three injection ports in examples 2 and 3, but only in the two first ones in examples 4 and 5. The comonomer contents of these resins were 9, 13, 14 and 18% by weight, respectively. Some reaction conditions and properties of the resins are summarised i Table 1.

TABLE 1

| Example | 2 | 3 | 4 | 5 |
|---|---|---|---|---|
| % by weight of MA in copolymer | 9 | 13 | 14 | 18 |
| Mole % of MA in copolymer | 3.12 | 4.64 | 5.03 | 6.67 |
| Peak reactor temperature (° C.) | 300 | 285 | 285 | 285 |
| Average reactor temperature (° C.) | 260 | 251 | 246 | 241 |
| Conversion (% ethylene in feed reacted) | 33 | 27 | 24 | 21 |
| Melting point of resin (° C.) | 101 | 98 | 97 | 94 |
| $MFR_2$ of resin (g/10 min) | 6 | 6 | 2 | 2 |

These results illustrate that also here high conversions are reached but the melt temperatures of the resins obtained are not quite at level with those of the inventive ones.

EXAMPLE 6

To show the reduced amount of carbon black needed for the semiconducting layer with the non-uniform EMA copolymer according to the present invention the following test was made.

Two different EMA copolymers, EMA 1 and EMA 2, were prepared. Both were prepared by polymerisation of ethylene and methyl acrylate in a tube reactor. EMA 1 was prepared by introducing equal amounts of methyl acrylate in the first and second injection points of the tube reactor and introducing equal amounts of ethylene in the first and second injection points of the tube reactor. EMA 2 was prepared by introducing all the MA in the first injection point of the tube reactor, while the ethylene was introduced in equal amounts in the first and second injection points of the tube reactor. The characteristics of EMA 1 and EMA 2 were as follows:

EMA 1: MA=9% by weight; $MFR_2$=6 g/10 min; $T_m$=101° C.

EMA 2: MA=9% by weight; $MFR_2$=6 g/10 min; $T_m$=107° C.

Semiconductive compositions were prepared by compounding EMA 1 and EMA 2, respectively, with carbon black, and stabiliser in a Buss kneader. The amount of carbon black in the compositions was varied, while the amount of stabiliser was kept constant at 0.6% by weight. 1% by weight of peroxide was then soaked into the compositions as a cross-linking agent.

Medium voltage cables comprising an aluminium conductor surrounded in order by an inner semiconducting layer, an insulating polyethylene layer, and an outer semiconducting layer, were manufactured using the semiconducting compositions as inner and outer semiconducting layers. Thereafter, the semiconducting layers and the insulating layer of the cable were cross-linked.

In order to function properly as a semiconducting layer the semi-conductive composition should have a volume resistivity of at most 1000 ohm-cm. The volume resistivity is highly dependent on the amount of carbon black. The volume resistivities of the outer semiconducting layers of the cables having compositions with varying amounts of carbon black and based, respectively, on the two different EMA copolymers (EMA 1 and EMA 2) were determined. For both the compositions containing EMA 1 and the compositions containing EMA 2 a decrease of the volume resisitivity with an increasing content of carbon black was observed as expected. In order to obtain a volume resistivity of 1 000 ohm-cm for the outer semiconducting layer 35.5% by weight of carbon black was needed for the composition containing EMA 1, while only 33% by weight of carbon black was needed for the composition containing EMA 2. Thus, the composition containing the more non-uniform EMA required less carbon black.

EXAMPLE 7–10

To demonstrate the improvement in the water tree retardant properties of the semiconductive compositions of the invention, the following test was made. Four different semiconductive compositions (Examples 7–10) were prepared in a Buss kneader.

The same furnace black type, stabiliser type and content, as well as peroxide type and content was used in examples 7–10. The conductivity of the four compositions was similar. The copolymers used in examples 7–9 were all produced by adding comonomer in two steps, giving a more homogeneous comonomer distribution represented by a melting point below the condition specified for the present invention. The copolymer used in example 10 on the other hand was produced by adding all the comonomer in the first step, giving a more heterogeneous comonomer distribution represented by a melting point according to the condition specified for the present invention. Thus, the compositions of Examples 7–9 were not in accordance with the present invention, while the composition of Example 10 was in accordance with the present invention.

Each of the four compositions above was incorporated as inner semiconducting layers in electric cables, which, seen from inside and outwards, consisted of a 1.4 mm copper conductor, an inner semiconducting layer having an outer diameter of 2.8 mm, an insulating layer having an outer diameter of 5.8 mm and an outer semiconducting layer having an outer diameter of 6.1 mm. The insulating layer consisted of low-density polyethylene having an MFR of 2 g/10 min, and the outer semiconducting layer consisted of an ethylene butyl acrylate copolymer with an addition of about 40% by weight carbon black.

The testing of the dielectric strength was carried out on these test cables in accordance with a method developed by Alcatel A G & Co, Hannover, Germany, and described in an article by Land H. G., Schädlich Hans, "Model Cable Test for Evaluating the Ageing Behaviour under Water Influence of Compounds for Medium Voltage Cables", Conference Proceedings of Jlcable 91, 24–28 June 1991, Versaille, France. As a value of the dielectric strength is stated 63% of $E_{max}$ from Weibull diagram in kV/mm. The dielectric strength was measured after ageing for 1000 h at 9 kV/mm in 85/70° C. water. The results of the testing are stated in the Table below.

| Example | 7 | 8 | 9 | 10 |
|---|---|---|---|---|
| Copolymer type | BA | EA | MA | MA |
| Comonomer content in copolymer, wt % | 17 | 15 | 13 | 9 |
| MFR$_2$ of copolymer (g/10 min) | 7 | 7 | 10 | 6 |
| Melting point of copolymer (° C.) | 96 | 97 | 98 | 107 |
| Furnace black content, wt % | 39 | 38 | 36 | 33 |
| Stabiliser content, wt % | 0.7 | 0.7 | 0.7 | 0.7 |
| Peroxide content, wt % | 1 | 1 | 1 | 1 |
| Dielectric strength after 1000 h wet aging, kV/mm | 40 | 41 | 39 | 64 |

The results in the Table show that the cable with an inner semiconducting layer of the composition of the present invention (Example 10) gives a much higher dielectric strength than when using a semiconducting layer based on a conventional copolymer composition (Examples 7–9). The cable with an inner semiconducting layer of the composition according to the present invention thus unexpectedly gives much better water tree retardant (WTR) properties than a semiconducting composition based on a conventional copolymer.

What is claimed is:

1. A semiconducting composition for electric cables which, based on the total weight of the composition, comprises
    (a) 50–90% by weight of an ethylene copolymer;
    (b) carbon black in an amount at least sufficient to make the composition semiconducting;
    (c) 0–8% by weight of a peroxide cross-linking agent; and
    (d) 0–8% by weight of conventional additives,
    wherein the ethylene copolymer (a) is a heterogeneous ethylene-alkyl(meth)acrylate copolymer with the comonomer units distributed non-randomly in the polymer chains, which besides ethylene moieties comprises 2–10 mole % of an alkyl(meth)acrylate comonomer moiety, chosen from the group consisting of: methyl (meth)acrylate, ethyl(meth)acrylate, (iso)propyl(meth)acrylate and butyl(meth)acrylate, and the melting point of which is at least 95° C. and is higher than (108.5−1.7×(mole % of alkyl(meth)acrylate comonomer)) degree centigrade; and
    wherein said semiconducting composition is used for inner or non-strippable outer semiconductive layers of said electric cables.

2. A composition as claimed in claim 1, wherein the ethylene-alkyl(methyl)acrylate copolymer has been obtained by high pressure radical polymerisation in a tubular reactor.

3. A composition as claimed in claim 2, wherein the ethylene-alkyl (meth)acrylate copolymer (a) has been obtained by high pressure radical polymerisation in a multiple zone tubular reactor by feeding 50–100% by weight of the alkyl (meth)acrylate to the first reaction zone of the tubular reactor.

4. A composition as claimed in claim 2, wherein the ethylene-alkyl(meth)acrylate copolymer (a) has been obtained by high pressure radical polymerisation in a multiple zone tubular reactor with feeding of the alkyl(meth)acrylate to one zone of the reactor only and feeding of the ethylene to at least two zones of the reactor, the weight ratio of alkyl (meth)acrylate to ethylene in the feed to the reaction zones differing from the overall ratio of methyl acrylate to ethylene in the copolymer and being at most 1:1.

5. A composition according to claim 1, wherein the ethylene-alkyl(meth)acrylate copolymer comprises 7–18% by weight of alkyl(meth)acrylate, based on the weight of the copolymer.

6. A composition according to claims 1, wherein the ethylene copolymer is a heterogeneous ethylene-methyl acrylate copolymer.

7. A composition according to claim 1, wherein the composition contains 15–45% by weight of carbon black, based on the weight of the composition, as the component (b).

8. A composition according to claim 1, wherein the composition contains 0.2–2% by weight of peroxide cross-linking agent, as the component (c).

9. An electrical cable comprising a conductor which, in the order from inside outward, is surrounded by an inner semiconducting layer, an insulating layer, and an outer semiconducting layer,
    wherein said inner semiconducting layer and/or said outer semiconducting layer when the outer semiconducting layer is non-strippable is derived from a semiconducting composition which, based on the total weight of the composition, comprises
    (a) 50–90% by weight of an ethylene copolymer;
    (b) carbon black in an amount at least sufficient to make the composition semiconducting;
    (c) 0–8% by weight of a peroxide cross-linking agent; and
    (d) 0–8% by weight of conventional additives,
    wherein the ethylene copolymer (a) is a heterogeneous ethylene-alkyl(meth)acrylate copolymer with the comonomer units distributed non-randomly in the polymer chains, which besides ethylene moieties comprises 2–10 mole % of an alkyl(meth)acrylate comonomer moiety, chosen from the group consisting of: methyl (meth)acrylate, ethyl(meth)acrylate, (iso)propyl(meth)acrylate and butyl(meth)acrylate, and the melting point of which is at least 95° C. and is higher than (108.5−1.7×(mole % of alkyl(meth)acrylate comonomer)) degree centigrade.

10. An electric cable according to claim 9, wherein the ethylene-alkyl (meth)acrylate copolymer (a) contains 7–18% by weight of alkyl(meth)acrylate, based on (a).

11. The electric cable according to claim 9, wherein the ethylene alkyl(meth)acrylate copolymer has been obtained by high pressure radical polymerization in a tubular reactor.

12. The electric cable according to claim 11, wherein the ethylene-alkyl(meth)acrylate copolymer (a) has been obtained by high pressure radical polymerization in a multiple zone tubular reactor by feeding 50–100% by weight of the alkyl(meth)acrylate to the first reaction zone of the tubular reactor.

13. A method of producing a cross-linked, semiconducting layer of an electric cable including a conductor which, in the order from inside and outwards, is surrounded by an inner semiconducting layer, an insulating layer, and an outer semiconducting layer, at least one of said inner and outer semiconducting layers being derived from a cross-linkable, semiconducting composition which, based on the total weight of the composition, comprises
   (a) 50–90% by weight of an ethylene copolymer,
   (b) carbon black in an amount at least sufficient to make the composition semiconducting,
   (c) 0.2–8% by weight of a peroxide cross-linking agent,
   (d) 0–8% by weight of conventional additives,
   characterised in that
      the ethylene copolymer (a) is a heterogeneous ethylene-alkyl(meth)acrylate copolymer, which besides ethylene moieties comprises 2–10 mole % of an alkyl (meth)acrylate comonomer moiety, chosen among methyl(meth)acrylate, ethyl(meth)acrylate, (iso-)propyl(meth)acrylate and butyl(meth)acrylate, and the melting point of which is at least 95° C. and is higher than (108.5−1.7×(mole % of alkyl(meth)acrylate comonomer)) degree centigrade, and that the composition is cross-linked at a temperature of 300–400° C.

* * * * *